US007577906B2

(12) United States Patent
Friedrichowitz et al.

(10) Patent No.: US 7,577,906 B2
(45) Date of Patent: Aug. 18, 2009

(54) METHOD AND SYSTEM FOR DOCUMENT ASSEMBLY

(75) Inventors: Ingo Friedrichowitz, Kirkland, WA (US); Yoram Yaacovi, Tel Mond (IL); Alisson Sol, Redmond, WA (US); Roy Zuniga, Duvall, WA (US); Jason Malcolm, Renton, WA (US); Gwen Sweeney, Seattle, WA (US); Russ Burtner, Everett, WA (US); Peter Rinearson, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 11/129,645

(22) Filed: May 13, 2005
(Under 37 CFR 1.47)

(65) Prior Publication Data
US 2006/0101321 A1 May 11, 2006

Related U.S. Application Data

(60) Provisional application No. 60/626,313, filed on Nov. 8, 2004.

(51) Int. Cl.
*G06F 15/00* (2006.01)
(52) U.S. Cl. .................. 715/246; 715/277; 715/233; 707/8; 707/9; 707/10; 709/203
(58) Field of Classification Search ............... 715/530, 715/531, 511, 751; 707/8–10; 709/203
See application file for complete search history.

(56) References Cited

U.S. PATENT DOCUMENTS

| 5,220,657 | A | * | 6/1993 | Bly et al. | 711/152 |
|---|---|---|---|---|---|
| 5,515,491 | A | | 5/1996 | Bates et al. | 395/155 |
| 5,787,175 | A | * | 7/1998 | Carter | 713/165 |
| 5,928,363 | A | * | 7/1999 | Ruvolo | 726/22 |
| 6,029,175 | A | * | 2/2000 | Chow et al. | 707/104.1 |
| 6,088,702 | A | | 7/2000 | Plantz et al. | 707/103 |
| 6,632,251 | B1 | | 10/2003 | Rutten et al. | 715/530 |
| 7,236,355 | B2 | * | 6/2007 | Kim | 361/683 |
| 2002/0059272 | A1 | * | 5/2002 | Porter | 707/100 |

(Continued)

OTHER PUBLICATIONS

Burch, Barbara, Naotes R5 Technical Overview, Apr. 1, 1999, IBM, pp. 1-11.*

(Continued)

*Primary Examiner*—Nathan Hillery
(74) *Attorney, Agent, or Firm*—Merchant & Gould, P.C.

(57) ABSTRACT

The assembly of documents assembled by a team is simplified. Document sections are assigned to a team member from within a word-processing document. Once a document template is opened by a user, the different sections within the document may be assigned to team members. Once a section is assigned, a notification is sent to the team members indicating the assignment. The team member may access their assigned section(s) through the notification. The team member may also access a central location to edit the sections they have been assigned. Team members from within the document may also search and use content from one or more content libraries to assist in the document assembly. Newly created content may also be saved to a new and/or existing content library. The content is then available to other team members working on the same or different projects.

20 Claims, 15 Drawing Sheets

U.S. PATENT DOCUMENTS

| | | | |
|---|---|---|---|
| 2002/0099775 A1 * | 7/2002 | Gupta et al. | 709/205 |
| 2003/0105820 A1 * | 6/2003 | Haims et al. | 709/205 |
| 2003/0179230 A1 * | 9/2003 | Seidman | 345/750 |
| 2003/0220905 A1 * | 11/2003 | Amado et al. | 707/1 |
| 2004/0011835 A1 * | 1/2004 | Kim | 224/312 |
| 2004/0114258 A1 * | 6/2004 | Harris et al. | 359/841 |
| 2005/0138554 A1 * | 6/2005 | Bell et al. | 715/530 |
| 2005/0223336 A1 * | 10/2005 | Plow et al. | 715/804 |

OTHER PUBLICATIONS

Florio, Susan, Notes R5: Calendar & scheduling, Dec. 1, 1998, IBM, pp. 1-9.*

Millhollon, Mary and Murray, Katherine; Microsoft® Office Word 2003 Inside Out; Publisher: Microsoft Press; Pub Date: Nov. 5, 2003; pp. 9.*

Millhollon, Mary and Murray, Katherine; Microsoft® Office Word 2003 Inside Out; Publisher: Microsoft Press; Pub Date: Nov. 5, 2003; pp. 10-16.*

* cited by examiner

Fig. 7

METHOD AND SYSTEM FOR DOCUMENT ASSEMBLY

RELATED APPLICATION

This utility patent application claims the benefit under 35 United States Code § 119(e) of U.S. Provisional Patent Application No. 60/626,313 filed on Nov. 8, 2004, which is hereby incorporated by reference in its entirety.

BACKGROUND OF THE INVENTION

Document assembly is often a very time consuming and difficult task. This may be especially true when a document is better authored by a team of individuals. Typically, a team created document includes a user acting as a document manager. The document manager needs to find the right template, divide the template into sections, and assign the sections to individual editors for creation. Proposals are one such type of document that may be created by a team.

Today, teams spend a lot of time searching for and recreating content for their document. Time is also spent attempting to share information and coordinate the process.

SUMMARY OF THE INVENTION

Briefly stated, embodiments of the present invention are related to simplifying the process of document assembly by a team. Document assembly includes all of the steps of creating, reviewing, revising, reusing, and publishing a document jointly as a team.

According to one aspect of the invention, sections of the document are assigned to editors from within the document itself. The document is opened, the section to assign is selected, and the editor to which to assign the section is selected.

According to another aspect of the invention, notifications are automatically sent to the editors that are assigned a section of the document. The editor may access their assigned section (s) through the notification. The editor may also access a central location to edit the sections they have been assigned.

According to yet another aspect of the invention, editors, from within the document, may search and use content from one or more content libraries to assist in the document assembly. For example, an editor may be able to find best practice documents, boilerplate, latest product data, legal statements, and the like that may be inserted within the document.

According to yet another aspect of the invention, the editors work on a single copy of the document. Copies of the document do not need to be provided to each editor on the team, thereby assisting in avoiding version control issues.

According to still yet another aspect of the invention, an editor may save newly created content to a new and/or existing content library. The published content is then available to other editors working on the same or different projects.

BRIEF DESCRIPTION OF THE DRAWINGS

FIGS. 5-15 are exemplary screen shots showing the assembly of a document, in accordance with aspects of the present invention.

DETAILED DESCRIPTION OF THE PREFERRED EMBODIMENT

Embodiments of the present invention are related to simplifying the process of assembling documents assembled by a team. Document assembly includes all of the steps of creating, reviewing, revising, reusing, and publishing a document jointly as a team. Document sections may be assigned to team member(s) (also referred to as an "editor") directly from within a word-processing document. Once a section is assigned, a notification is sent to the editors indicating their assignment. The editor may access the document of their assigned section(s) through the notification. The editor may also access a central location to edit the sections they have been assigned. Editors, from within the document, may also search and use content from one or more content libraries to assist in the document assembly. For example, an editor may be able to find best practice documents, boilerplate, latest product data, legal statements, and the like that may be inserted within the document. Newly created content may also be saved to a new and/or existing content library. The content is then available to other editors working on the same or different projects. Copies of the document being assembled do not need to be provided to each editor on the team. Instead, a single copy of the document is used throughout the document assembly process, thereby assisting in avoiding version control issues.

Team Document Assembly System

Figure 2:
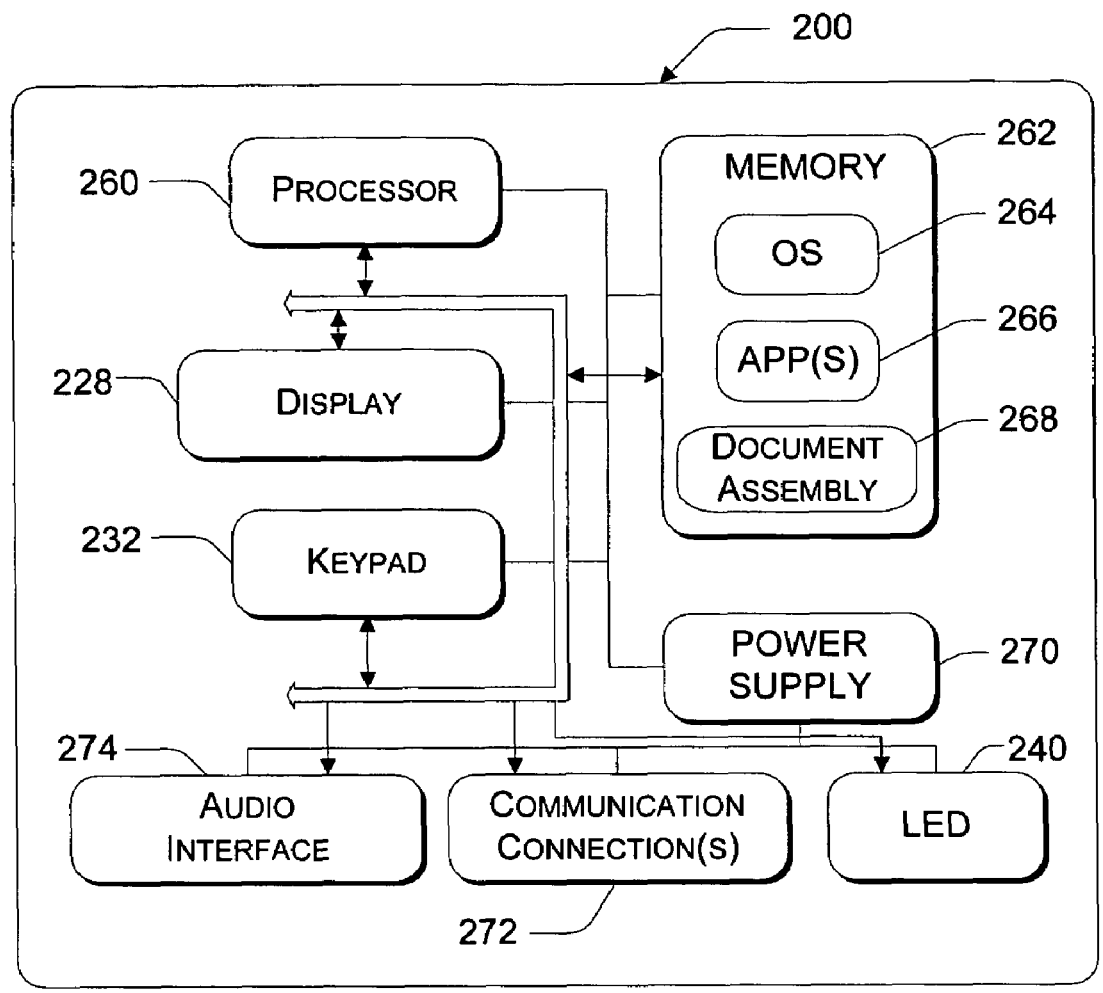
Figure 3:
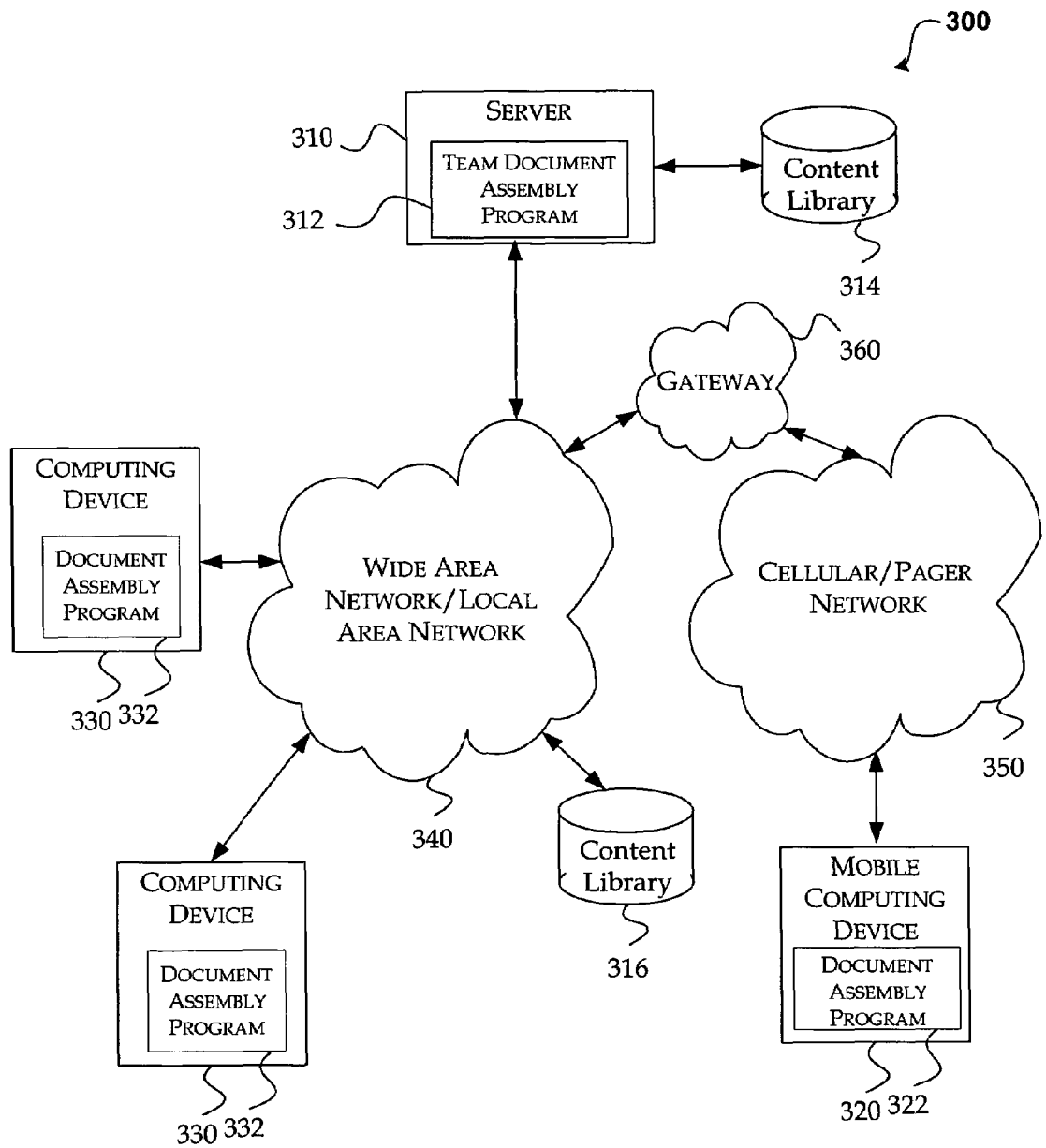
FIG. 3 is a functional block diagram generally illustrating a document assembly system.

FIG. 3 is a functional block diagram generally illustrating a document assembly system 300, in accordance with aspects of the invention. As illustrated, system 300 includes server 310, document assembly programs 312, 322 and 332, content libraries 314 and 316, and clients 320 and 330. Server 310 and computing device 330 are computing devices such as the one described in conjunction with FIG. 1 and mobile device 320 is a mobile computing device such as the one described in conjunction with FIG. 2. According to one embodiment, mobile device 320 is connected to their corporate Intranet.

Initially, a user who is in charge of assigning sections of a document (the document manager) to team members accesses a document on a computing device, such as computing device 320 or 330. According to one embodiment, the document is a word-processing document that is shared by multiple users and is stored on a central server, such as server 310. According to one embodiment of the invention, only a single copy of the document is stored and used within the assembly of the document. Server 310 may be accessed by the editors assigned to create the document.

Document assembly program applications 322 and 332 residing on mobile device 320 and computing device 330 are configured to interact with team document assembly program 312 on server 310 and are configured to behave as a word-processor, such as Microsoft Word®, developed by Microsoft Corporation. According to one embodiment, programs 322 and 332 are web-based client applications and are configured to display and interact with a word-processing document that is being assembled and that is stored on server 310. Programs 322 and 332 are configured to communicate with document program 312 on server 310 using any one of several client-server protocols.

The document manager, or other team member, from within the document program, selects a section of the document to assign by placing the curser within the document section and then assigns the section to a team member for editing by selecting an editor. According to one embodiment, the editor is selected from a list of available editors. Other ways may be also used to select the editor. For example, the document manager could type in the name or email address of the desired editor. Once the section is assigned, team document program 312 sends a notification to the selected editor indicating the assignment. The editor may then access a link within the notification to access the document. Alternatively, the editor may directly access the document by opening the document through their document assembly program. According to one embodiment, the assigned section of the document may only be edited by someone who has been assigned that section.

The content libraries (314 and 316) are used to store content that may be included within a document being created by the team of editors. According to one embodiment, the content libraries utilize Microsoft's Windows® SharePoint Services (WSS) and include content such as section and boilerplate text that can be searched, retrieved and incorporated into a team created document. The WSS are used to assist in providing a central collaboration and storage site for each document being created. According to one embodiment, a SQL server, such as Microsoft's SQL Server 2000, is used to store the content library.

Any editor may search the content libraries for content to be included within the document directly from their document program (322, 332) while editing their assigned section(s). A document editor may also publish content that they have created to a content library. A document editor may publish content to a content library (314 and/or 316) by selecting the content they desire to publish within their document program and upload the content to the content library and/or libraries. Other document editors may then search for the published content uploaded by the user.

Server 310 runs team document assembly program 312. Document assembly program 312 is configured to interact with clients 320 and 330. Data may be transmitted between the computing devices and the server over a wide area network (WAN)/local area network (LAN) 340 and or cellular/pager network 350. The clients may also interact with the documents that are stored on server 310. According to one embodiment, the document is accessed on server 310 and then rendered to the user's web browser on their machine.

Cellular/pager network 350 is a network responsible for delivering messages to and receiving messages from wireless devices. The cellular/pager network 350 may include both wireless and wired components. For example, cellular/pager network may include a cellular tower that is linked to a wired telephone network. Typically, the cellular tower carries communication to and from cell phones, long-distance communication links, and the like.

Gateway 360 routes messages between cellular/pager network 350 and WAN/LAN 340. For example, a computer user may send a message that is addressed to a cellular phone. Gateway 360 provides a means for transporting the message from the WAN/LAN 340 to cellular/pager network 350. Conversely, a user with a device connected to a cellular network may be browsing the Web. Gateway 360 allows hyperlink text protocol (HTTP) messages to be transferred between WAN/LAN 340 and cellular/pager network 350.

Figure 4:
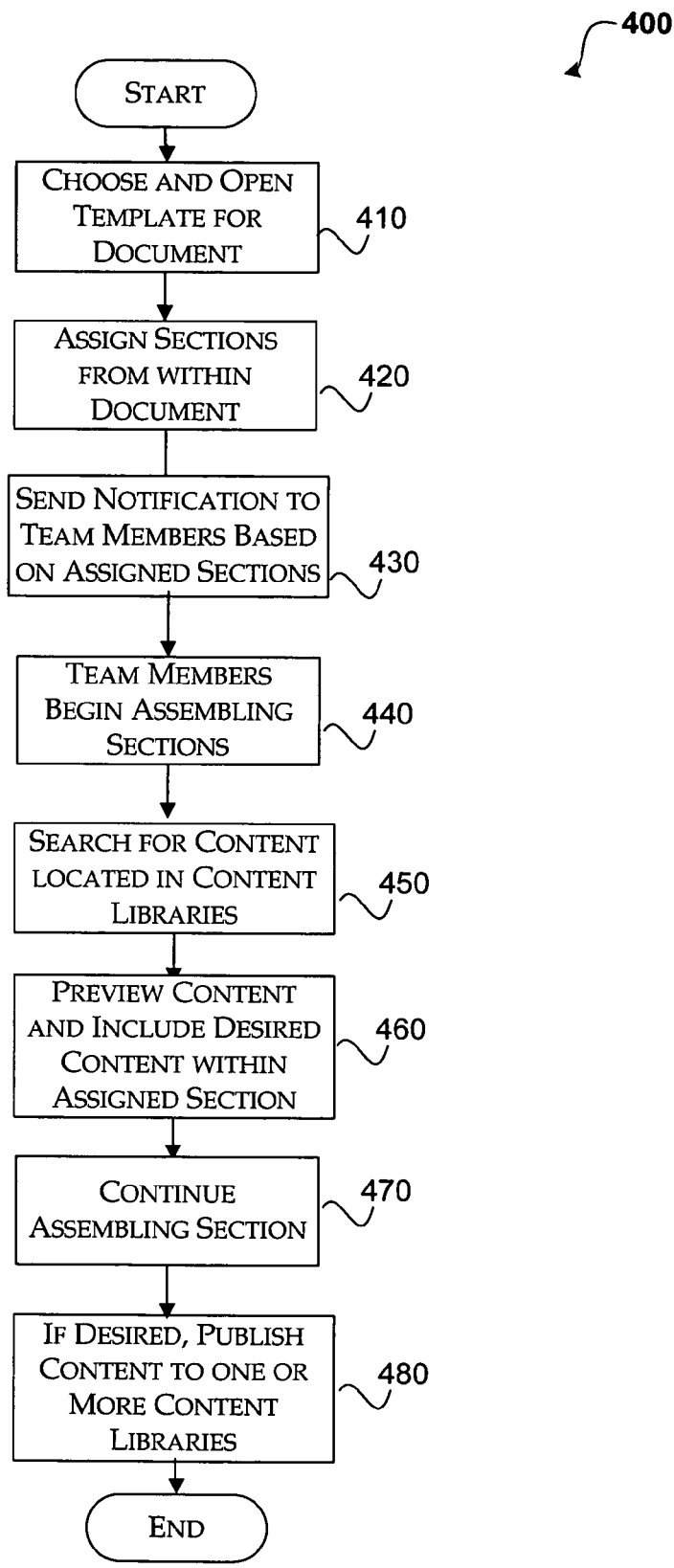
FIG. 4 illustrates a process for creating a document.

FIG. 4 illustrates a process for creating a document, in accordance with aspects of the invention. After a start block, the process flows to block 410, where the document manager chooses and opens up a document template. According to one embodiment, a template includes the basic structure of the document to be created, including items such as section headings, as well as other boiler plate that is associated with the document to be created. Many templates may exist. For example, one or more templates may exist for each different type of document to be created. Alternatively, the user may create a new document template.

Flowing to block 420, the sections of the document are assigned to the editor(s) responsible for the section. According to one embodiment of the invention, anyone involved in the document assembly may assign sections of the document. For example, the document manager may assign sections to team members; team members may assign their assigned section to other team members (e.g. when subject matter expertise is needed), team members may assign their section back to the document manager (e.g. when completed and request review), and the like.

The assignment of the sections occurs directly from within the document. For example, according to one embodiment, a task pane within a word-processing program is used to assign the section of the document. To assign the section, the document manager, or other team member, selects the section that is to be assigned and then selects the editor from the task pane.

Transitioning to block 430, a notification is sent to each of the editors indicating the section(s) they are responsible for assembling. According to one embodiment, the notification includes the location of the document as well as a link to the section itself.

Moving to block 440, the editor accesses their assigned section and begins the assembly process. To help ease the burden on creating content for the section, the editor may search for content located within a content library.

At block 450, the editor may, directly from within the word-processing document, search for content to include within their section. The editor may search more than one content library for content. For instance, the editor may choose to search all of the available content libraries, a subset of the available content libraries, or a single content library.

Flowing to block 460, located content meeting the editor's search criteria is previewed by the editor. If the editor desires to include the located content then that material is incorporated within the section. According to one embodiment, the editor highlights the portion of the preview content to indicate the content that they would like to include within the section.

Moving to block 470, the editor continues to assemble their assigned section. At any point during the assembling of the document, the editor may publish content to one or more content libraries (block 480). Once the content is published the content may be searched by other editors and included within a document without having to be recreated. According to one embodiment, the content that is desired to be published is highlighted within the document and then the editor selects a menu item within the word-processor to publish the selection. The process then moves to an end block, and returns to processing other actions.

Example Screen Shots of Assembling a Document

FIGS. 5-15 are exemplary screen shots showing the assembly of a document. While the example illustrates creating a proposal document, any type of document may be assembled.

Figure 5:

FIG. 5 shows an exemplary screen shot of accessing a proposal library, in accordance with aspects of the invention. According to one embodiment, the library provides the team member with a list of document assembly sites that they may access. Initially, the document manager selects a location from which the proposal is to be based. According to one embodiment of the invention, a document manager accesses a WSS site. The site provides a central location to access information related to the portions of the document a user may be assigned. As illustrated, there are sites for different customers.

Figure 6:
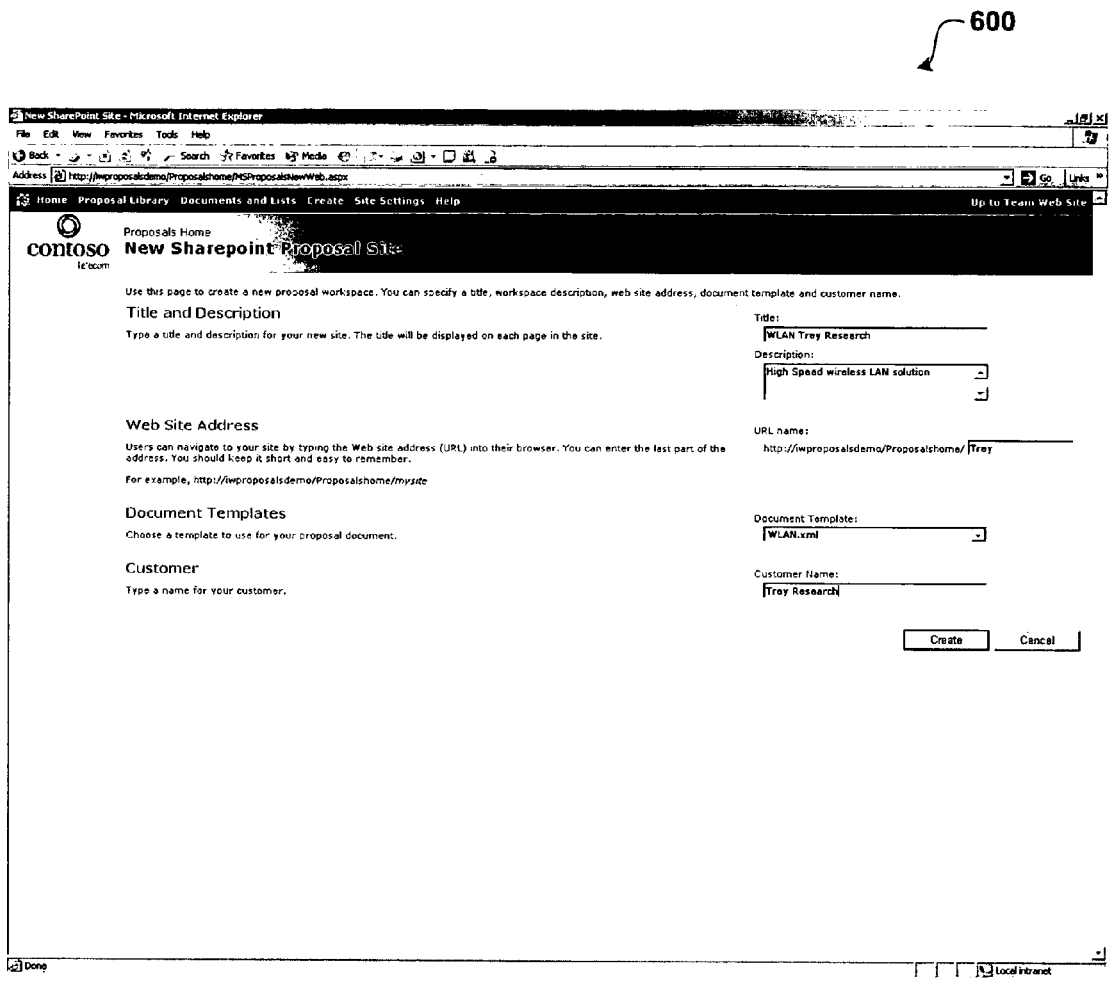

FIG. 6 illustrates creating a new proposal site including proposal document, in accordance with aspects of the invention. As illustrated, the document manager may enter a title, a brief description of the document, a URL name that may be used to access the information relating to the document, the document template that the proposal is based on, as well as a customer name.

Figure 7:
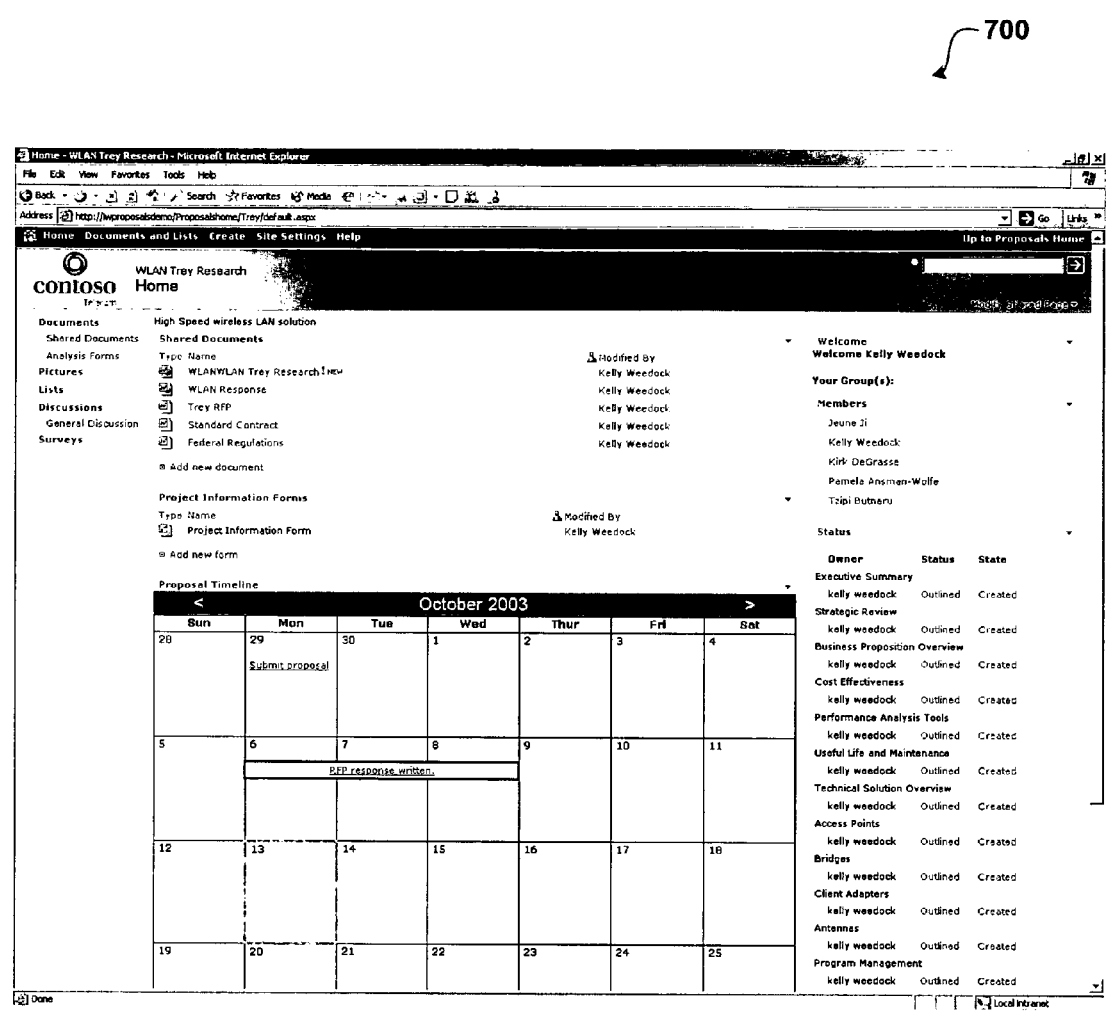

FIG. 7 shows a home page created in response to the new proposal site, in accordance with aspects of the invention. This home site is directed at helping to effectively manage the key elements related to the proposal. According to one embodiment, the home site includes: the most recent and approved documents for sharing; the team members assigned to edit at least one section of the document; a status column, along with a calendar that includes milestones and meetings. The home site may be customized for each individual proposal.

Figure 8:
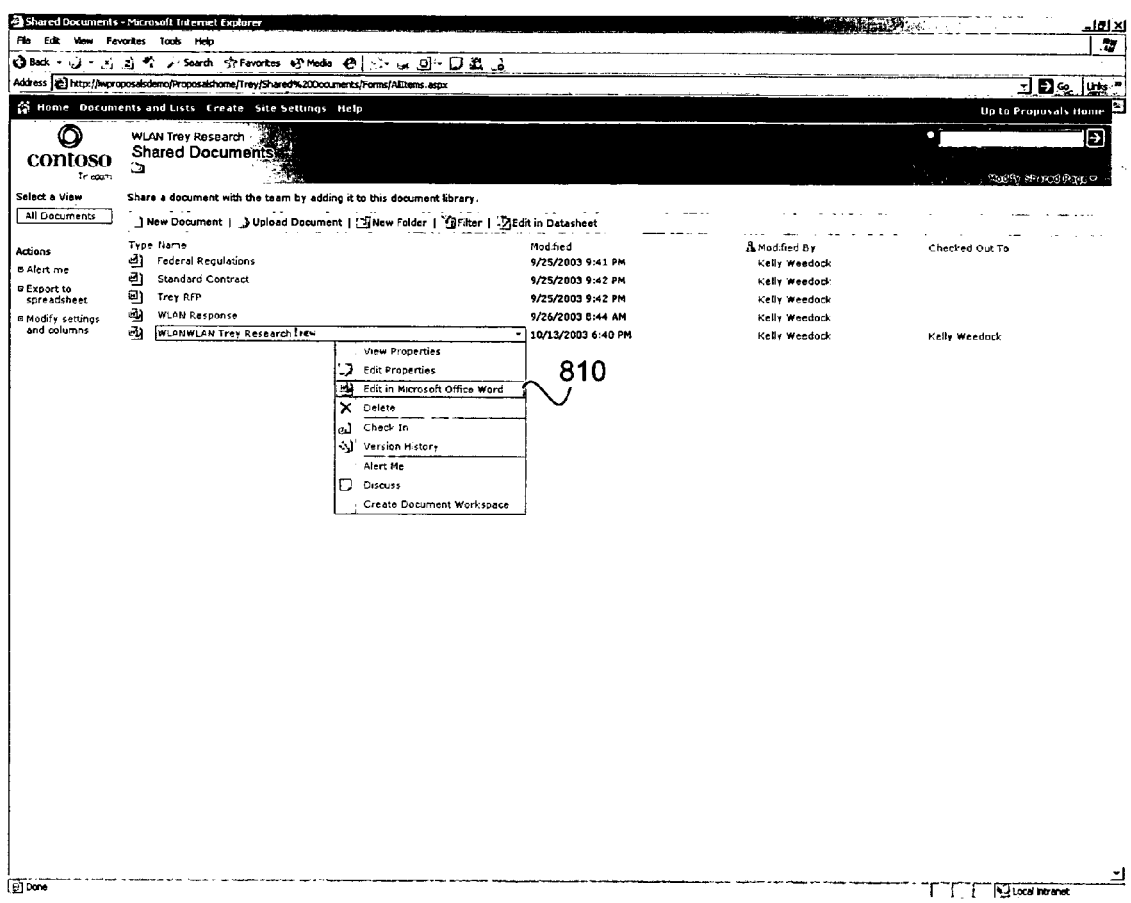

FIG. 8 illustrates opening the newly created document in a word processor, in accordance with aspects of the present invention. Once the document has been created (See FIG. 6), the document may be opened by an editing program, such as Microsoft Office Word, for assigning sections and editing. Once selected for editing, the document is opened.

Figure 9:
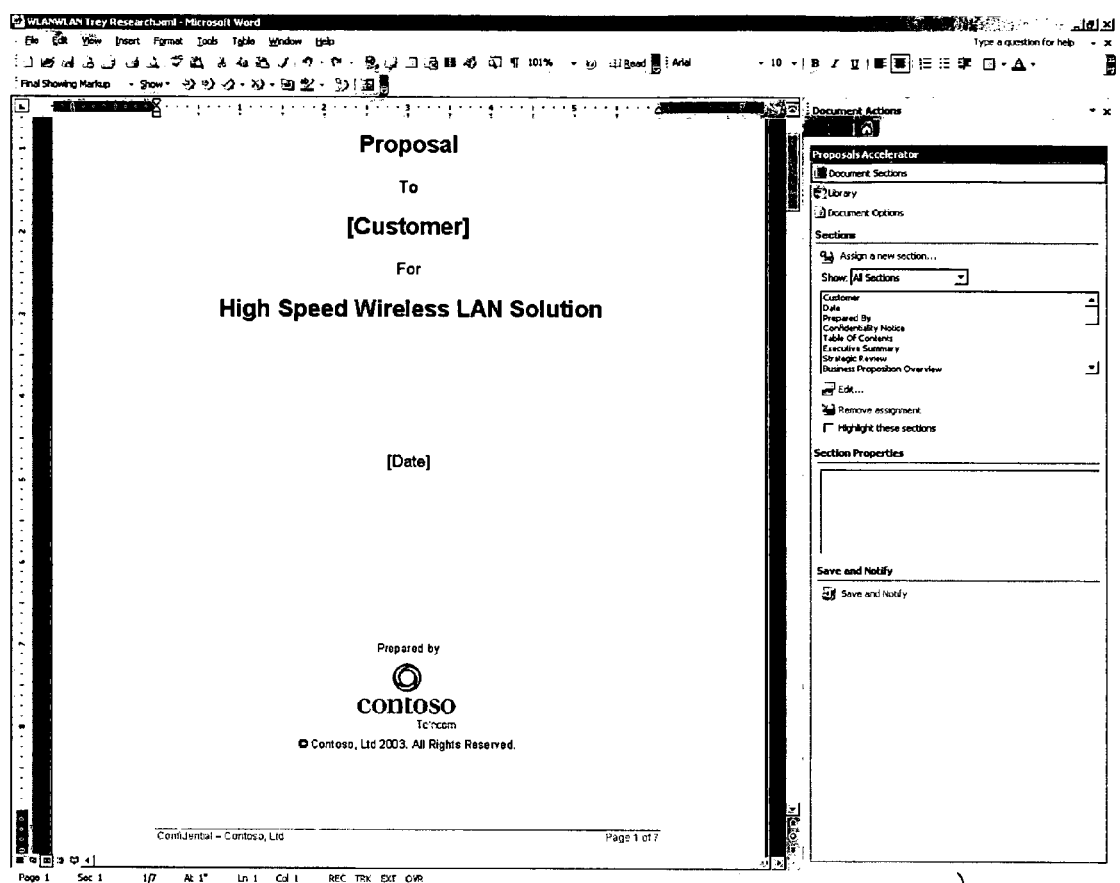

FIG. 9 shows the newly created document template opened in the word-processor, in accordance with aspects of the present invention.

As illustrated, the template already contains some of the boilerplate that is commonly included within a document of this type. For example, the template may include the latest confidentiality statement; background section, approved formatting rules, response sections, and the like. According to one embodiment, a task pane (910) shows the sections, a link to content libraries, an option to assign a section, section properties and a save and notify option.

Figure 10:
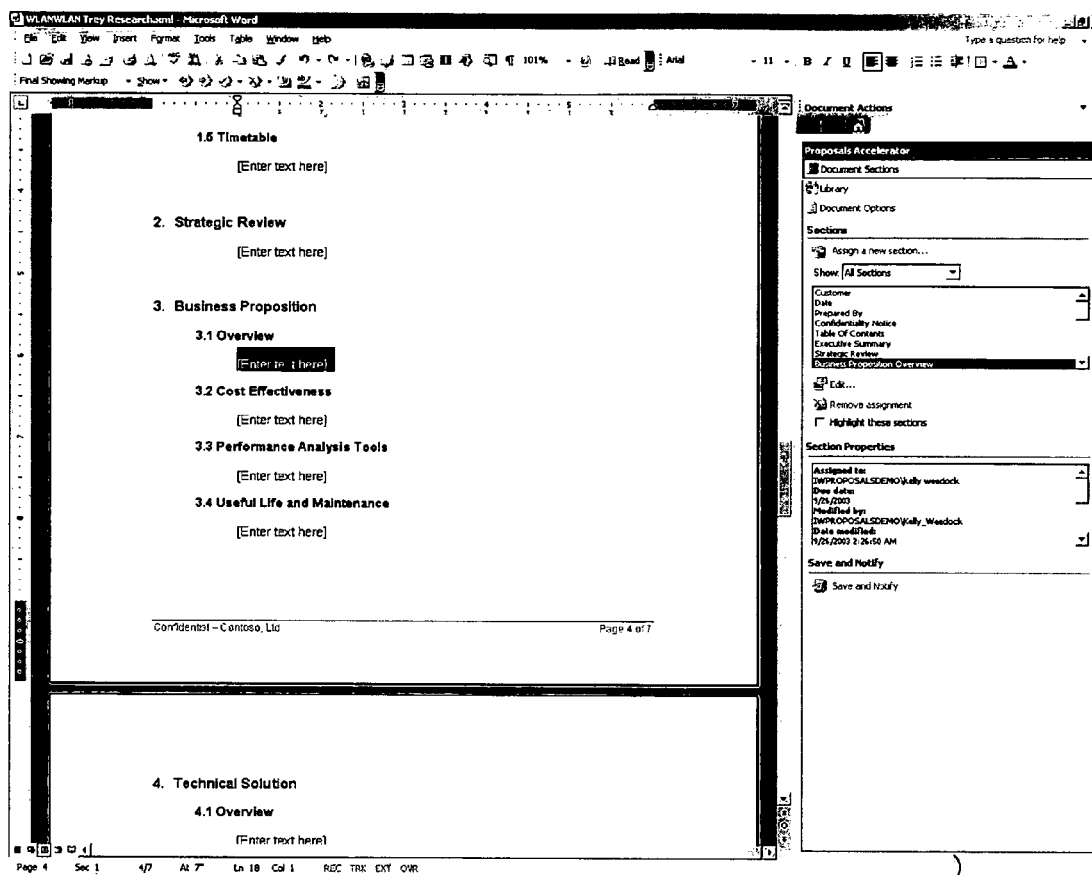

FIG. 10 illustrates assigning a section of the document to an editor, in accordance with aspects of the invention. According to one embodiment, the team member, such as the document manager, selects a section of the document that they would like to assign. In the present example, the Business proposition overview section is selected. Once selected, task pane 910 is updated to show the selection along with the current section properties. A section of the document may be assigned without having to switch to another program, such as an email program and attaching documents and sending the email to the assigned editor.

Figure 11:
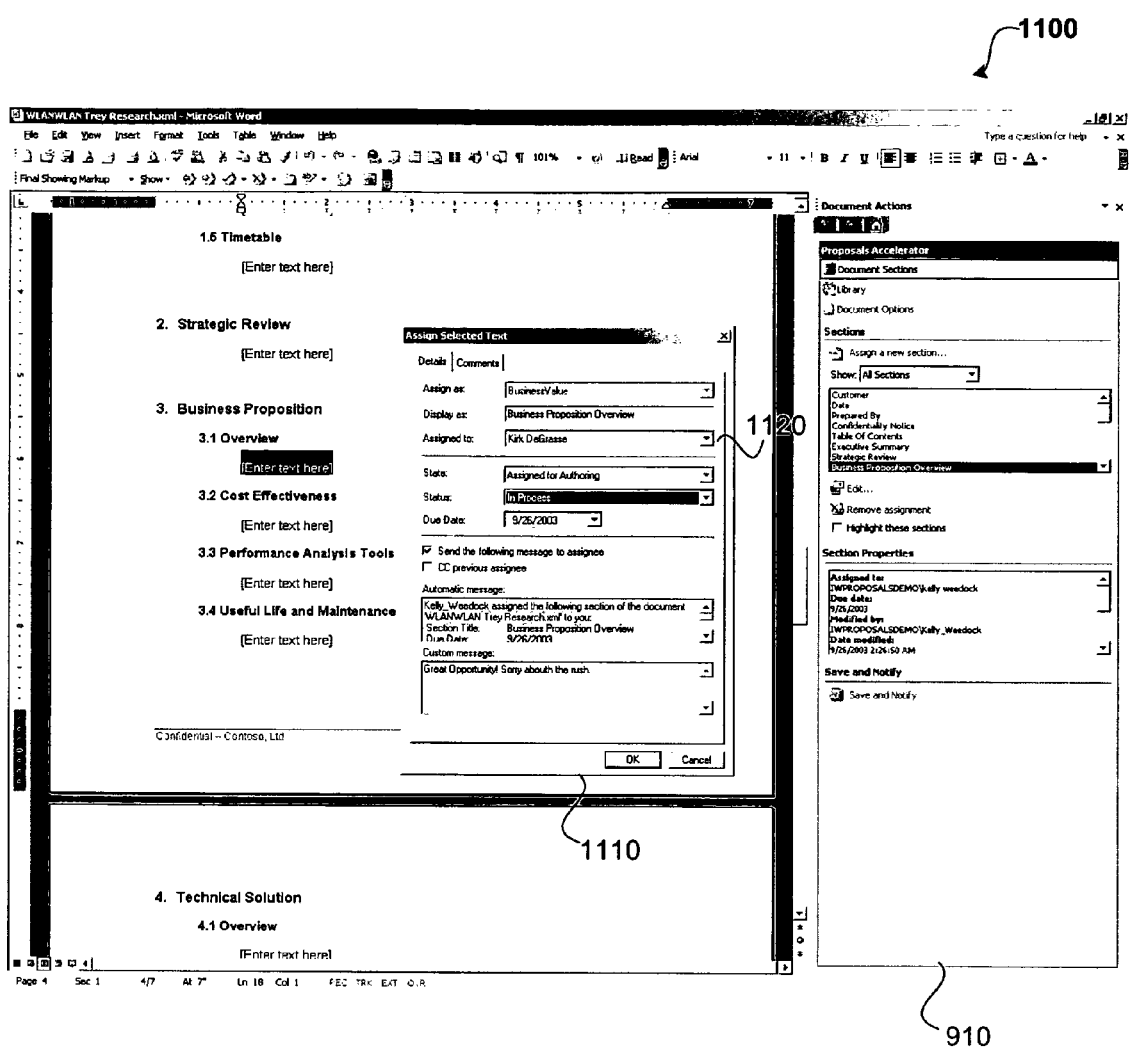

FIG. 11 shows assigning the section and creating a notification, in accordance with aspects of the invention. Window 1110 includes drop down list 1120 which is used to select the editor in charge of the section. Window 1110 also includes a state dropdown that is used to indicate the state of the section, a status drop down that indicates the status of the section, as well as a due date drop down. A personal message may also be included along with an automated message that is sent to the editor once the section has been assigned. According to one embodiment, the automated message includes a link to the proposal document located on the home site. Once the team member is satisfied with their entries they may select the OK button.

When the save and notify option is selected from task pane 910, an email is automatically sent to the editor indicating that a section of a document has been assigned to them. A similar process is used by the editor once they have completed editing their section(s) of the document.

Figure 12:
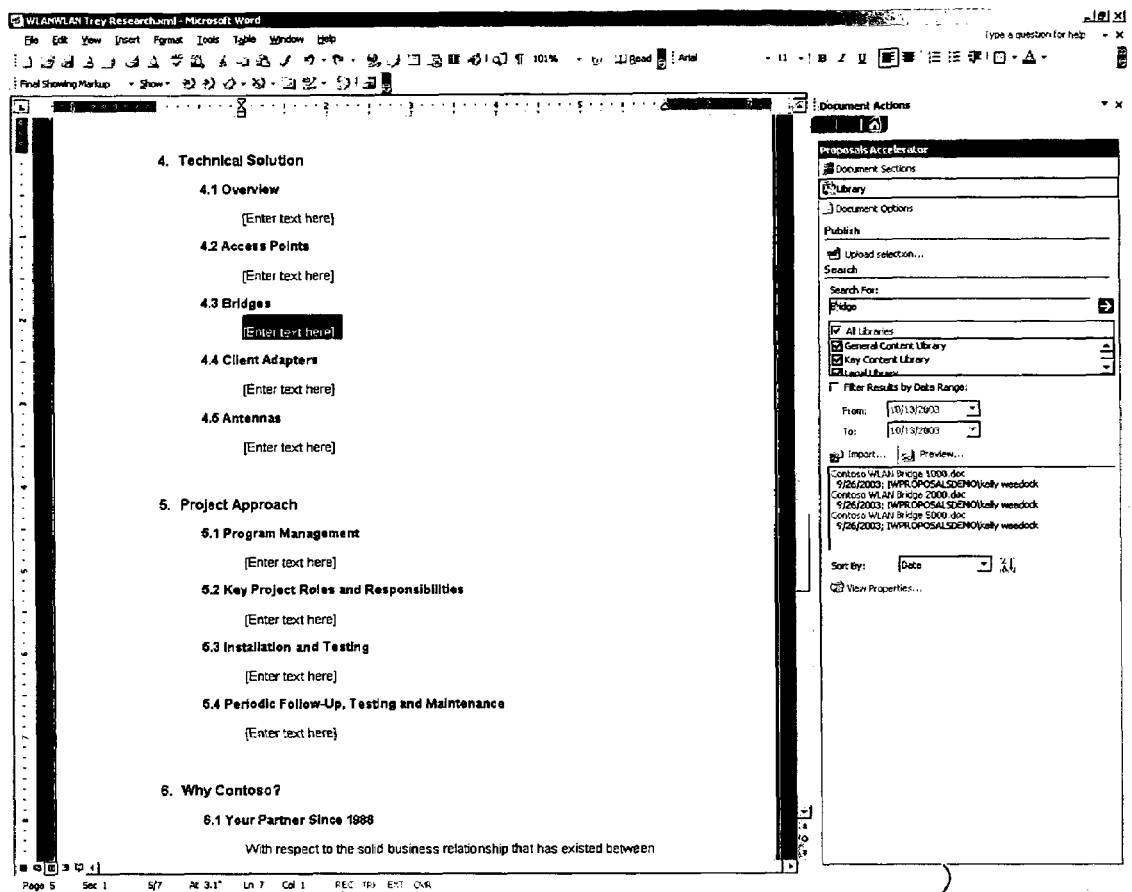

FIG. 12 illustrates searching one or more content libraries for content to include within a section of the document, in accordance with aspects of the present invention. As illustrated, the editor is in the process of assembling the bridges section of the document. In order to assist the editor in the assembly of content for the section, they may search for content from a content library directly from within the document. Accessing task pane 910, the editor enters their search term(s) within the search field and selects the content libraries to include within the search.

Figure 13:
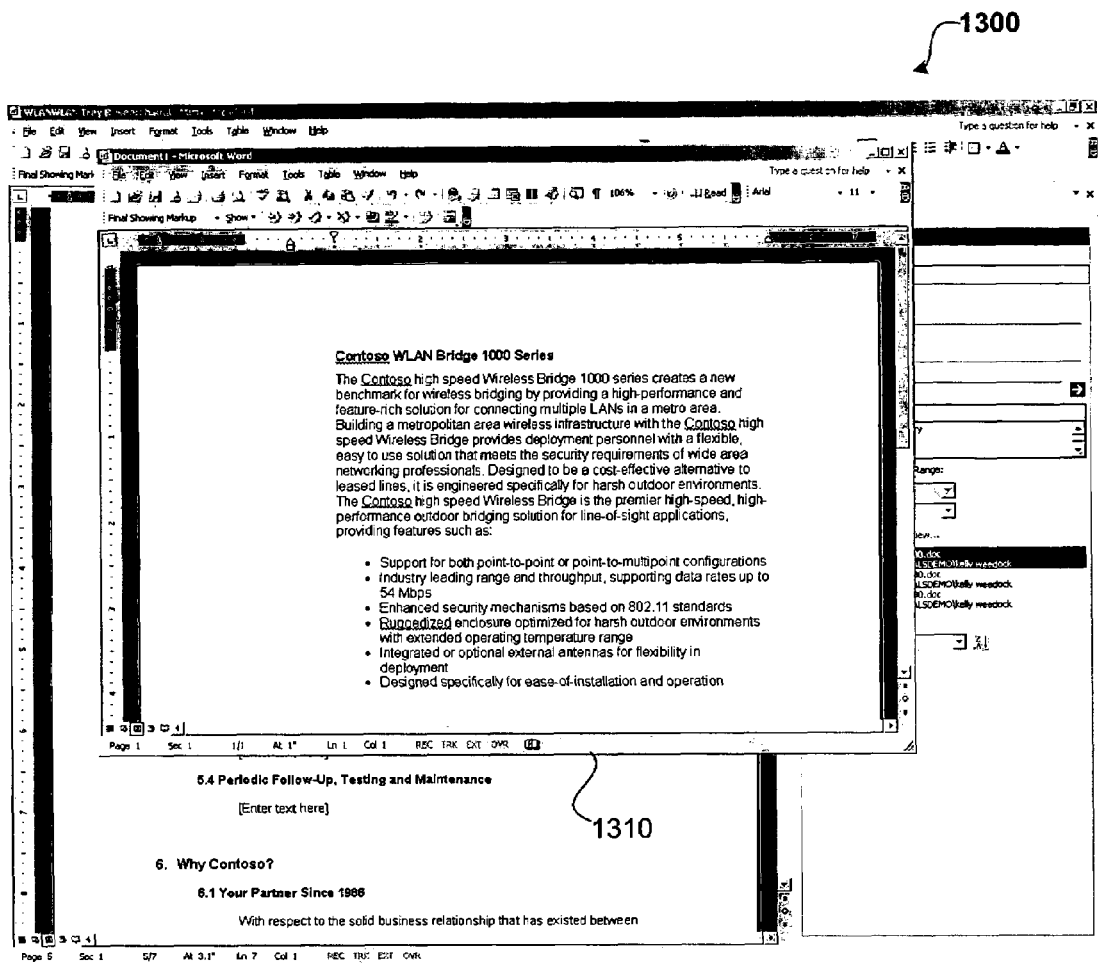

FIG. 13 shows a preview of a section of the document initially created by searching a content library, in accordance with aspects of the present invention. In response to the search criteria entered (See FIG. 12) a preview of located content is shown to the editor in window 1310. The editor may review the content located within the preview window (1310) and decide whether to incorporate the content within their assigned section. According to one embodiment, the editor highlights the content within the preview window that they would like to include within their section. This highlighted content is then imported directly into the section. Other ways may be used to incorporate the content within the section. For instance, the located content could be automatically incorporated into the document or the editor could select a button to incorporate the content.

Figure 14:
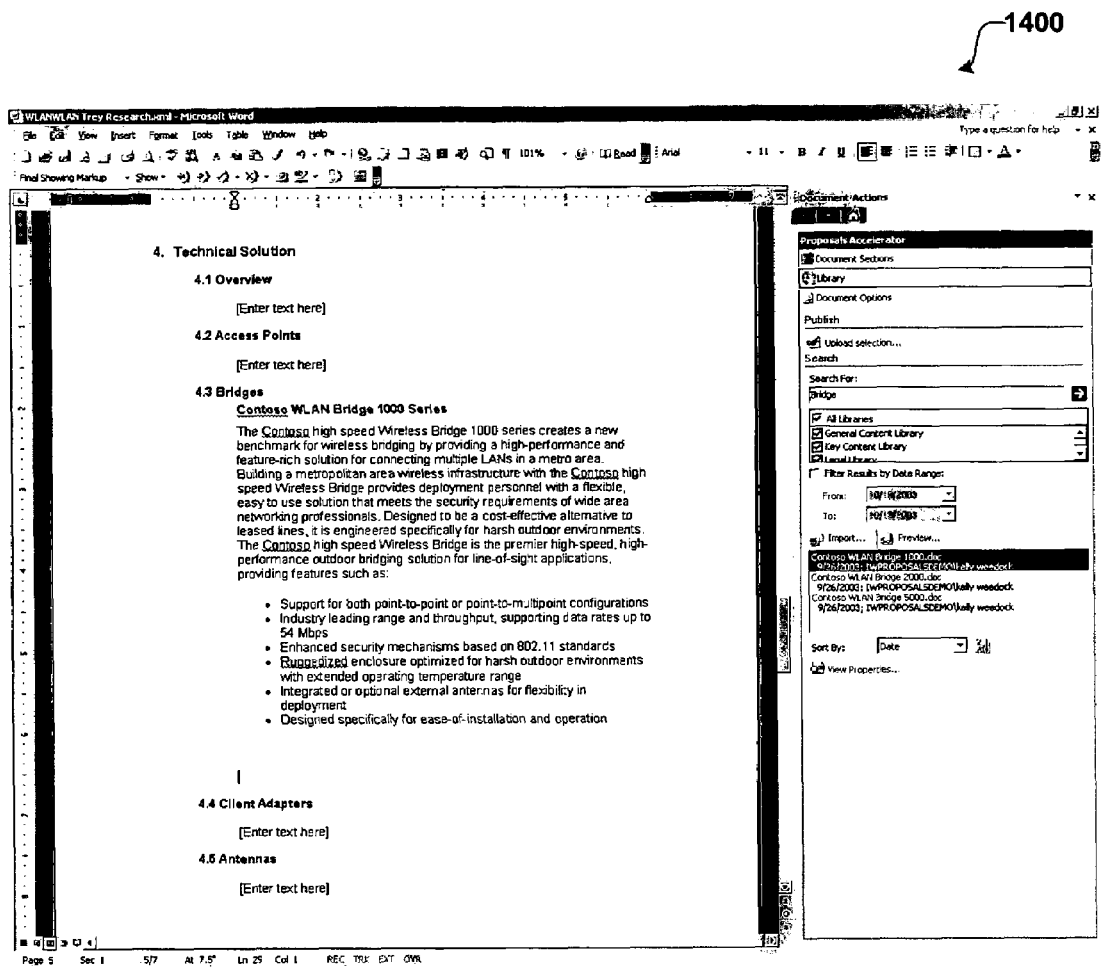

FIG. 14 illustrates the imported section incorporated into the document, in accordance with aspects of the invention. As can be seen, the content that was illustrated within the preview window (1310) shown in FIG. 13 is now incorporated directly within the section. The ability to search for and incorporate content directly from within the document dramatically speeds up document assembly by not having to leave the document to search for and/or create content that may be already available. The other editors may also search the content libraries for content related to their section.

Figure 15:
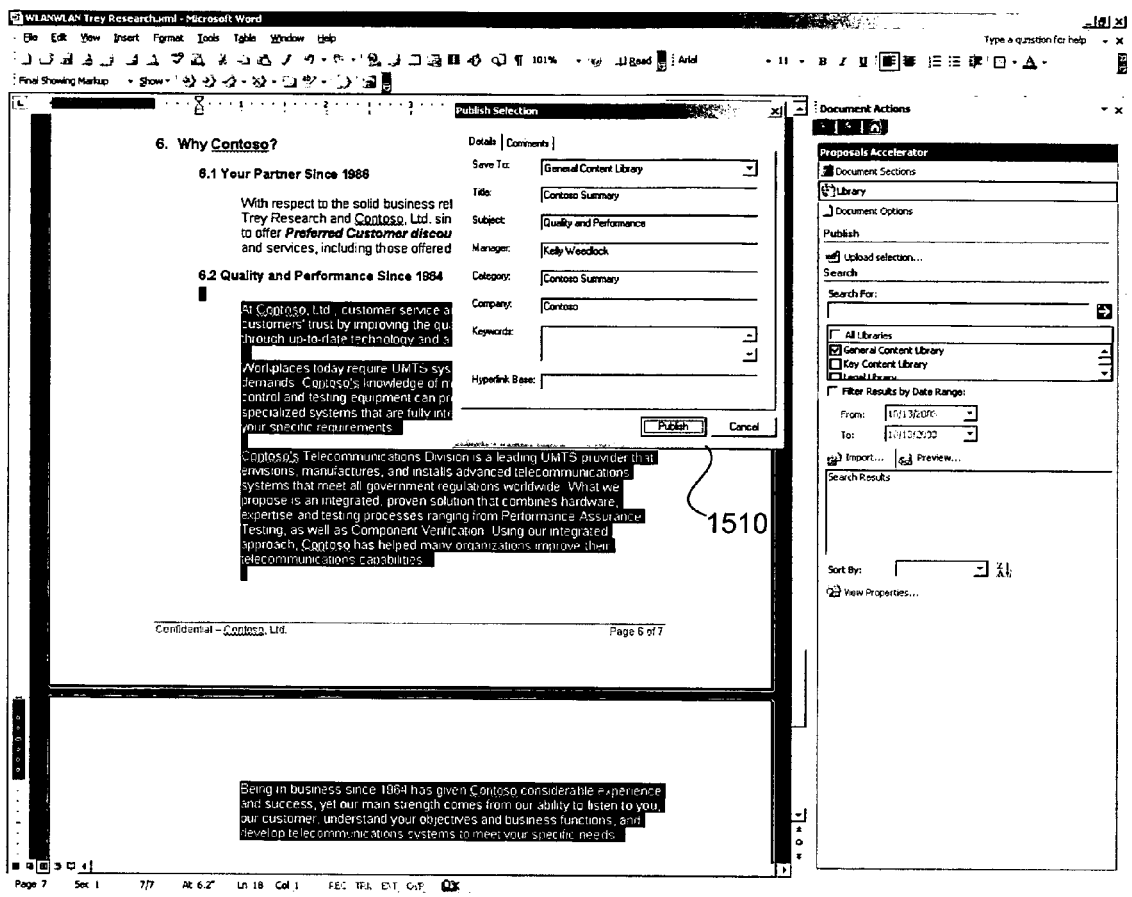

FIG. 15 illustrates publishing content from a section to a content library, in accordance with aspects of the invention.

From within the document, the editor may publish content that has been created for their section to one or more content libraries. Publishing the content helps to standardize expertise by capturing and publishing reusable and best-practice content to a content library.

In the present example, the editor has decided to publish the highlighted portion of the section such that it becomes available to other editors. Publish selection window 1510 is used to gather relevant information such that it may be published and indexed within a content library. Window 1510 includes a drop down list to select the content library to save the content to, the title of the content, a subject field, a manager field, a category field, a company field, a keywords field, as well as a hyperlink field. Once the editor has entered the information into window 1510, they select the publish button to publish the selection to the chosen content library.

Illustrative Operating Environment

Figure 1:
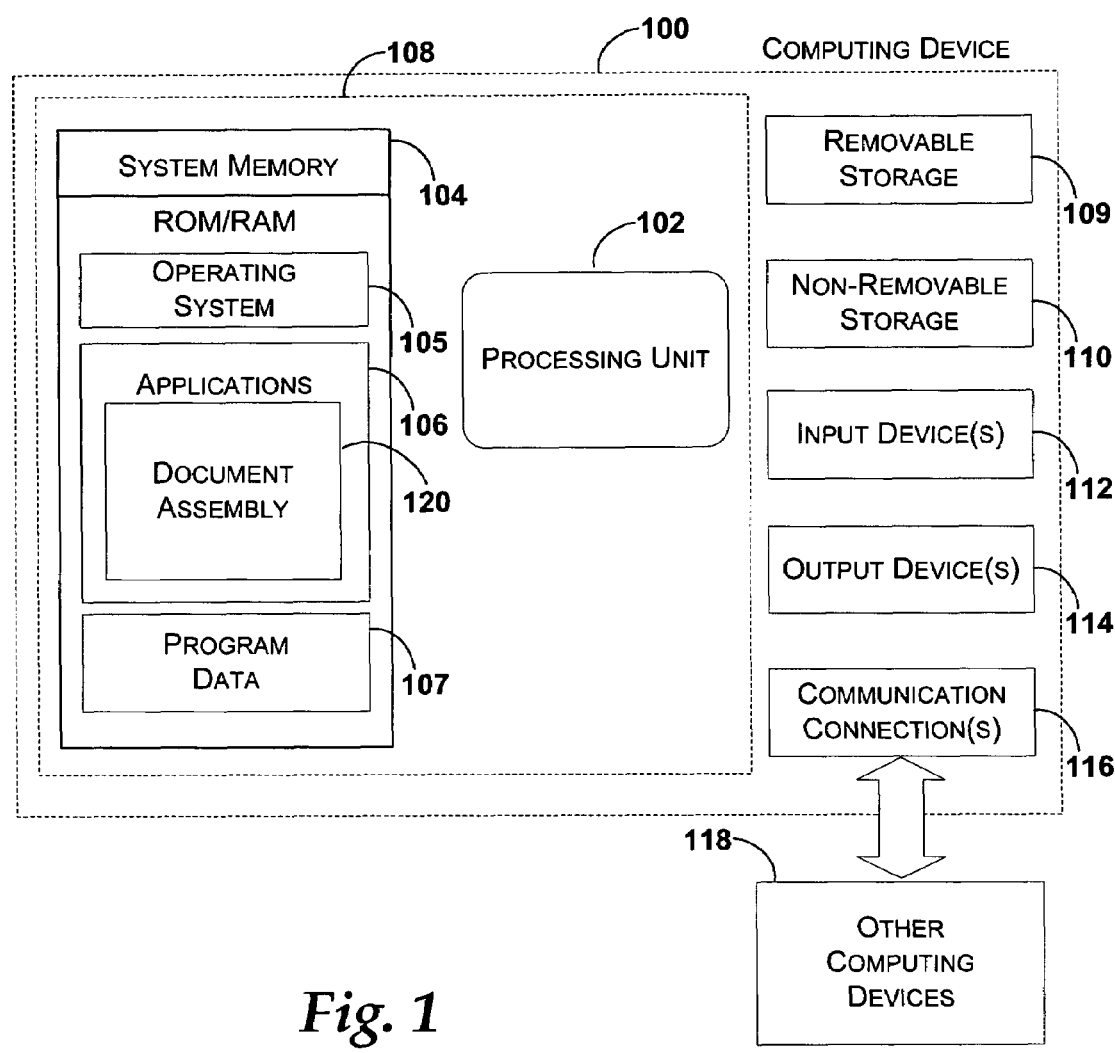
FIGS. 1 and 2 illustrate exemplary computing devices.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a document assembly program 120. In another embodiment, application 106 may be a team document assembly program when computing device 100 is configured as a server. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

FIG. 2 illustrates a mobile computing device that may be used in one exemplary embodiment of the present invention. With reference to FIG. 2, one exemplary system for implementing the invention includes a mobile computing device, such as mobile computing device 200. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on the operating system 264. Document assembly application 268 resides on mobile computing device 200 and is programmed to interact with a team document assembly program located on a server. Mobile computing device 200 also includes non-volatile storage 268 within memory 262. Non-volatile storage 268 may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes communications connection(s), such as a wireless interface layer, that performs the function of transmitting and receiving communications. Communications connection 272 facilitates wireless connectivity between the mobile computing device 200 and the outside world. According to one embodiment, transmissions to and from communications connection 272 are conducted under control of the operating system 264.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for assembling documents, comprising
a client computing device that is configured to access the network and that includes a program that is arranged to perform actions, including:
receiving a request to access a document, wherein the document includes sections and the document is shared by more than one user;
requesting a server computing device for the document;
receiving the document from the server;
displaying the document within a word processor window; wherein the document displayed includes displaying the section headings that are associated with the document;
receiving a request from within the word processor window to select a section of the document; wherein the request is a selection of text that is associated with the section; and
in response to the request, rendering a display comprising a plurality of child windows to the word processor window, the display including:
a proposal window, the proposal window comprising:
a section heading list, the section heading list including headings of sections in the document;
an assignment properties list, the assignment properties list comprising a plurality of assignment properties of the selected section of the document; and
an assignment window, wherein the assignment window is configured to facilitate an assignment of the selected section of the document to an editor, and the assignment window further comprises fields, the fields including:

an editor field displaying a name of an editor to perform the assignment of the selected section of the document, a due date field displaying a date the assignment of the selected section of the document is due, a status field displaying a current status of the assignment of the selected section of the document, wherein the current status is selected from a plurality of pre-defined status levels; and a message field displaying a message to be sent to the editor;

assigning the selected section of the document to an editor; and automatically sending the message to the editor indicating that the section is assigned to them for editing; wherein the message includes a link to the section assigned to them for editing; where the link directly accesses the section; and displays the section to the editor when selected.

2. The system of claim 1, wherein the program on the server computing device is further configured to perform locking the section of the document such that only an assigned editor of the section may access the section.

3. The system of claim 1, wherein assigning the section of the document comprises displaying a menu within the window that is configured to display a list of editors that may be selected to be assigned to the section.

4. The system of claim 1, further comprising a content library that is configured to store content and that is coupled to the server computing device and the client computing device; and wherein the program on the client computing device is further configured to initiate a search of the content library from within the window; previewing content retrieved from the search of the content library, receiving a selection of content from the previewed content and placing the content into the section.

5. The system of claim 4, wherein the program on the client computing device is further configured to display content that is located from the search of the content library within a preview window.

6. The system of claim 4, wherein the program on the client computing device is further configured to publish at least a portion of the section that is selected from within the window, to the content library.

7. A computer-implemented method for managing team assembled documents, comprising:

a client computing device that is configured to access the network and that includes a program that is arranged to perform the actions of:

receiving a request to access a document, the document including sections and being shared by more than one user;

requesting a server computing device for the document;

receiving the document from the server;

displaying the document within a word processor window, the document displayed includes displaying the section headings that are associated with the document;

receiving a request from within the word processor window to select a section of the document, the request being a selection of text that is associated with the section; and in response to the request, rendering a display comprising a plurality of child windows to the word processor window, the display including:

a proposal window, the proposal window comprising:

a section heading list, the section heading list including headings of sections in the document;

an assignment properties list, the assignment properties list comprising a plurality of assignment properties of the selected section of the document; and an assignment window, the assignment window facilitating an assignment of the selected section of the document to an editor, and the assignment window further comprising fields, the fields including:

an editor field displaying a name of an editor to perform the assignment of the selected section of the document, a due date field displaying a date the assignment of the selected section of the document is due, a status field displaying a current status of the assignment of the selected section of the document, the current status being selected from a plurality of pre-defined status levels; and a message field displaying a message to be sent to the editor;

assigning the selected section of the document to an editor; and automatically sending the message to the editor indicating that the section is assigned to them for editing, the message includes a link to the section assigned to them for editing, the link directly accesses the section; and displays the section to the editor when selected.

8. The method of claim 7, further comprising sending a notification to the editor in response to the editor being assigned the portion of the document; wherein the notification includes a link to the assigned section of the document.

9. The method of claim 7, wherein assigning the portion of the document to the editor comprises accessing a menu within the word processor program that was used to access the document and using the menu to select the editor.

10. The method of claim 7, further comprising searching a content library, from within the document, for material to be incorporated within the document.

11. The method of claim 10, further comprising previewing the material to the editor and importing the material located from the search upon acceptance of the material by the editor.

12. The method of claim 10, further comprising publishing a portion of the document, from within the document, to a content library such that the content may be searched from within a document being edited and reused within another document created after the portion of the document is published to the content library.

13. The method of claim 10, further comprising locking the portion of the document from unauthorized editing and maintaining a status of the assembly of the document and allowing team members to view the status.

14. A computer-readable storage medium having computer-executable instructions for use in assembling documents prepared by team members, comprising:

a client computing device that is configured to access the network and that includes a program that is arranged to perform the actions of:

receiving a request to access a document, the document including sections and being shared by more than one user;

requesting a server computing device for the document;

receiving the document from the server;

displaying the document within a word processor window, the document displayed includes displaying the section headings that are associated with the document;

receiving a request from within the word processor window to select a section of the document, the request being a selection of text that is associated with the section; and in response to the request, rendering a display comprising a plurality of child windows to the word processor window, the display including:
- a proposal window, the proposal window comprising:
  - a section heading list, the section heading list including headings of sections in the document;
  - an assignment properties list, the assignment properties list comprising a plurality of assignment properties of the selected section of the document; and
  - an assignment window, the assignment window facilitating an assignment of the selected section of the document to an editor, and the assignment window further comprising fields, the fields including:
    - an editor field displaying a name of an editor to perform the assignment of the selected section of the document,
    - a due date field displaying a date the assignment of the selected section of the document is due,
    - a status field displaying a current status of the assignment of the selected section of the document, the current status being selected from a plurality of pre-defined status levels; and
    - a message field displaying a message to be sent to the editor;

assigning the selected section of the document to an editor; and automatically sending the message to the editor indicating that the section is assigned to them for editing, the message includes a link to the section assigned to them for editing, the link directly accesses the section; and displays the section to the editor when selected.

15. The computer-readable storage medium of claim 14, further comprising preventing unauthorized editing of the section of the document and sending a notification to the editor when the section is assigned.

16. The computer-readable storage medium of claim 15, wherein assigning the section of the document to the editor comprises accessing a menu from within the program used to open the document and using the menu to select the editor.

17. The computer-readable storage medium of claim 14, further comprising searching a content library from within the opened document for material to be included within the document.

18. The computer-readable storage medium of claim 17, further comprising determining when the material may be of interest to the editor editing the document; previewing the material to the editor; and importing the material located from the search upon acceptance of the material by the editor into the opened document.

19. The computer-readable storage medium of claim 18, further comprising publishing a portion of the document, from within the document, to a content library such that the content may be searched from within a document being edited and reused within another document created after the portion of the document is published to the content library.

20. The computer-readable storage medium of claim 17, further comprising providing a status of the assembly of the document to editors that have been assigned at least one section of the document.

* * * * *